United States Patent [19]

Nishida et al.

[11] Patent Number: 4,984,017
[45] Date of Patent: Jan. 8, 1991

[54] VACUUM CONTACT TYPE PRINTING MACHINE AND METHOD OF CONTACT THEREFOR

[75] Inventors: Fumihiko Nishida; Makoto Yahata, both of Kyoto, Japan

[73] Assignee: Mitsubishi Denki Kabushiki Kaisha, Tokyo, Japan

[21] Appl. No.: 409,859

[22] Filed: Sep. 20, 1989

[30] Foreign Application Priority Data

Oct. 31, 1988 [JP] Japan .......................... 63-143132[U]

[51] Int. Cl.$^5$ ............................................. G03B 27/20
[52] U.S. Cl. ...................................................... 355/91
[58] Field of Search .................... 355/87, 91, 92, 94, 355/95, 93, 76

[56] References Cited

U.S. PATENT DOCUMENTS

| | | | |
|---|---|---|---|
| 4,484,813 | 11/1984 | Maher et al. | 355/93 |
| 4,580,892 | 4/1986 | Nishida et al. | 355/95 |
| 4,714,947 | 12/1987 | Nishida et al. | 355/91 X |
| 4,737,824 | 4/1988 | Sakai et al. | 355/91 X |
| 4,764,794 | 8/1988 | Fujii | 355/87 |
| 4,812,883 | 3/1989 | Ohlig | 355/91 |

Primary Examiner—L. T. Hix
Assistant Examiner—D. Rutledge
Attorney, Agent, or Firm—Lowe, Price, LeBlanc, Becker & Shur

[57] ABSTRACT

A vacuum contact type printing device, for carrying out printing with an original film and a photosensitive material maintained in contact with each other, includes a flexible sheet on which the photosensitive material is placed, a sheet holding portion provided below the sheet, an original holding portion for holding an original facing the sheet, and a sealable exposure chamber containing the sheet, the sheet holding portion and the original holding portion. Switching valves for switching the pressure of the central portion and of the peripheral portions of the sheet holding portion between a reduced pressure and the atmospheric pressure are provided at the central and peripheral portions. A vacuum pump is connected to the exposure chamber to reduce the pressure of the exposure chamber, and a pressure sensor for detecting the pressure in the exposure chamber is provided. The pressure between the sheet and the sheet holding portion is switched by the switching valves successively from the central portion outwardly to peripheral portions and from the reduced pressure to the atmospheric pressure in response to the output from the pressure sensor.

14 Claims, 5 Drawing Sheets

VACUUM CONTACT TYPE PRINTING MACHINE AND METHOD OF CONTACT THEREFOR

BACKGROUND OF THE INVENTION

1. Field of the Invention

The present invention relates to a vacuum contact type printing machine and a method of contact therefor employed in a process of reproduction. More specifically, the present invention relates to a large vacuum contact type printing machine and a method of contact therefor.

2. Description of the Related Art

Figure 8:
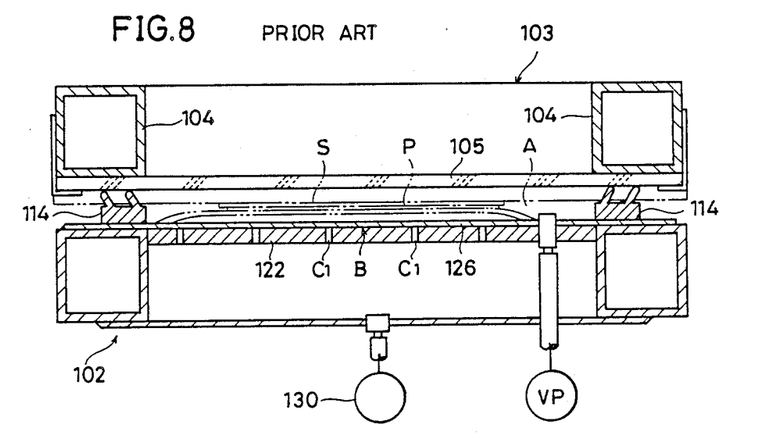
FIG. 8 shows a main portion of a conventional vacuum contact type printing machine.

A printing machine of interest to the present invention is disclosed in U.S Pat. No. 4,484,813. FIG. 8 shows a main portion of the printing machine shown in this patent. Referring to FIG. 8, a conventional printing machine comprises a printing table 102 holding a flexible blanket 126 on a blanket support plate 122 and an upper frame 103 which can be opened/closed in relation to the printing table 102. The upper frame 103 comprises a transparent plate 105 arranged on a lower surface of an edge frame 104. An airtight seal 114 is provided between the flexible blanket 126 and the transparent plate 105, whereby an exposure chamber A which is air tight is formed. The printing machine further comprises a vacuum pump VP for evacuating the exposure chamber A and a blanket attracting apparatus 130 which evacuates the air in a space B between the flexible blanket 126 and the blanket support plate 122. The space B may be maintained at atmospheric pressure as needed. When the air in the space B is evacuated, the flexible sheet 126 is brought into sealed contact with the blanket support plate 122.

An original film S and a photosensitive material P are held in contact between the flexible sheet 126 and the transparent plate 105 in the following manner. At first, the flexible blanket 126 is attracted to the blanket support plate 122 by means of the blanket attracting apparatus 130. In this state, the pressure in the exposure chamber A is reduced by the vacuum pump VP. Thereafter, the pressure in the space B is kept at atmospheric pressure.

The flexible blanket 126 is attracted to the blanket support plate 122 until the pressure in the exposure chamber A is reduced to some extent. Thereafter, the operation of the blanket attracting apparatus 130 is stopped and the pressure in the space B between the flexible blanket 126 and the blanket support plate 122 is kept at atmospheric pressure. Consequently, as shown by the two dotted chain lines in the figure, the flexible blanket is lifted by the atmospheric pressure in space B. Consequently, the original film S is brought into close contact with the photosensitive material P as shown by the two dotted chain lines in FIG. 8.

The conventional printing machine is structured as described above. It is adapted such that the flexible blanket 126 and the transparent plate 105 are brought into close contact gradually from the central portion to the peripheral portions. Consequently, any entrapped air which is likely to be present between the original film S and the photosensitive material P is readily removed. When attraction is done by the blanket attracting apparatus 130 or when the pressure in the space B is to be maintained at the atmospheric pressure, air is allowed to flow through communicating holes $C_1$.

The conventional printing machine having the above described structure has the following disadvantages:

(1) Since the atmospheric pressure works uniformly on the lower surface of the flexible blanket 126 through the communicating holes $C_1$, the flexible blanket 126 is not always brought into contact with the transparent plate 105 from the central portion to the peripheral portions.

(2) Especially in a printing machine having a large printing table, the above described disadvantage (1) becomes more conspicuous and air is more likely to be entrapped in the central portion. Therefore, it is difficult to realize satisfactory vacuum contact at high speed.

SUMMARY OF THE INVENTION

Therefore, one object of the present invention is to eliminate the above-described drawbacks.

The above-described object of the present invention can be attained by a vacuum printing machine, in which printing is carried out with an original film and a photosensitive material in contact with each other, comprising a flexible sheet for mounting the photosensitive material having end portions, a sheet holding apparatus provided below the sheet for fixing end portions of the sheet, having at least a central portion and periphery portions surrounding the central portion, and an exposure chamber which can be sealed containing the sheet, the sheet holding apparatus. The exposure chamber has a contact surface provided facing the central portion of the sheet. The photosensitive material is mounted on the sheet with the central portion thereof placed at the center. The printing machine further comprises a first pressure adjusting apparatus provided in the exposure chamber for keeping the exposure chamber at a first pressure, a second pressure adjusting apparatus provided on the sheet holding apparatus for selectively applying the first pressure or a second pressure higher than the first pressure between the sheet holding apparatus and the sheet, and a first switching apparatus for changing the output of the second pressure adjusting apparatus to the first pressure and then for switching the output to the second pressure gradually from the central portion to the peripheral portions of the sheet holding apparatus.

Since the printing machine of the present invention comprises the above described components, when the sealed exposure chamber is kept at a reduced pressure, a higher pressure than that in the exposure chamber is applied to the central portion and gradually to the peripheral portions in the space between the sheet and the sheet holding apparatus. Therefore, the photosensitive material mounted on the sheet is brought into a contact with the contact surface gradually starting from the central portion. Therefore, a vacuum printing apparatus can be provided in which the photosensitive material and the contact surface of the exposure chamber are brought into contact dependably from the central portion to the peripheral portions.

According to another aspect of the present invention, a method of bringing an original and a photosensitive material into contact with each other in a vacuum printing apparatus comprises the steps of placing a photosensitive material with the central portion thereof positioned at the center on a flexible sheet, the sheet having ends fixed to a sheet holding apparatus provided therebelow, placing an original at a position facing the sheet, adjusting a pressure in a sealable exposure chamber containing the sheet, the sheet holding apparatus and the original being subjected to a first pressure lower than atmospheric pressure, and adjusting a pressure at the central portion and then the pressure in the peripheral portions, in this order, of a space between the sheet and the sheet holding apparatus to a second pressure higher than the first pressure.

In accordance with another aspect of the present invention, the method of bringing the original and the photosensitive material into contact with each other comprises the above described steps. Therefore, a sealed chamber is held at a first pressure lower than the atmospheric pressure and then a second pressure higher than the first pressure is gradually applied, starting from the central portion to the peripheral portions, between the photosensitive material mounting sheet and the photosensitive material mounting sheet holding portion. Consequently, a method of bringing the original and the photosensitive material into contact is provided in which the photosensitive material and the original is brought into contact starting from the central portion and extending gradually to the peripheral portions.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One example of a vacuum contact type printing apparatus to which the present invention is applied will be described prior to the description of the present invention.

Figure 3:
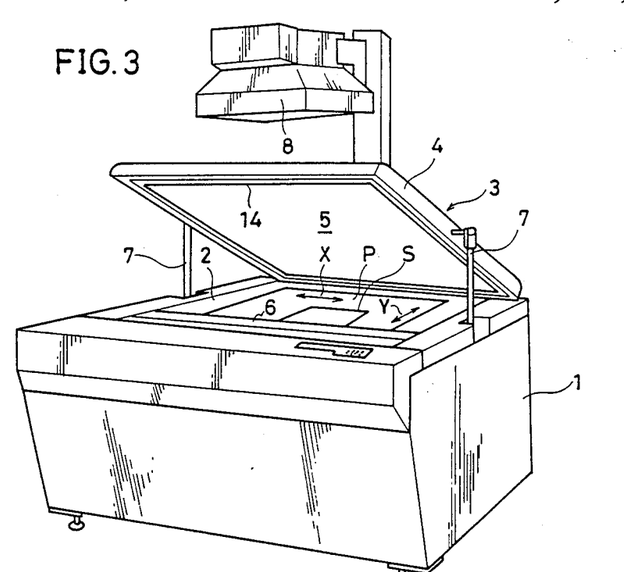
FIG. 3 is a perspective view of a conveyor type multiple image printing machine to which the present invention is applied.

Referring to FIG. 3, a conveyor type multiple image printing machine in which an original film is positioned by means of an original conveying belt comprises a printing table 2 which can be elevated and lowered provided on an upper surface of a body 1, an upper frame 3 having a transparent plate 5 on a lower surface of an edge frame 4, which can be opened and closed in relation to the printing table 2, a retractable masking device provided on the side of the upper surface of the transparent plate 5, an original conveying belt provided to be movable in the X-Y directions in relation to the printing table 2, a vacuum pump, not shown, for bringing the original and the photosensitive material into contact with each other, and a printing light source 8 provided above the transparent plate 5. The original film S is positioned by means of the original conveying belt 6 on a photosensitive material P such as a PS plate placed on the printing table 2, so that the image of the original S may be printed thereon.

Figure 4:
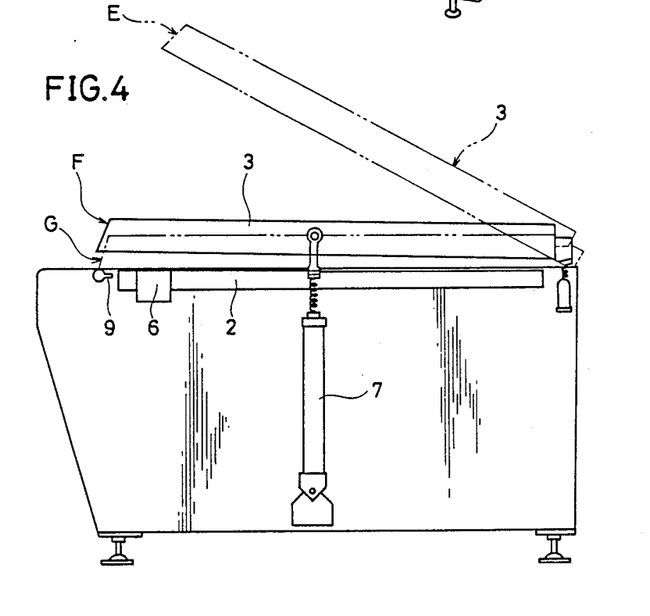
FIG. 4 is a cross-sectional view of a main portion of the conveyor type multiple image printing machine.

Referring to FIG. 4, the upper frame 3 can be switched to a full open attitude E, a half open attitude F and a closed attitude G by means of an air cylinder 7. In the full open attitude E, the photosensitive material P and the original films S are changed. In the half open attitude F, the original conveying belt 6 is operated and the original film is positioned at a prescribed positioned as the original is moved in the X-Y directions. Thereafter, the upper frame 3 is closed as shown by G, so that the printing is carried out with the original and the photosensitive material in contact with each other. The details are disclosed in, for example, Japanese Utility Model Laying Open No. 62-19649.

Figure 5:
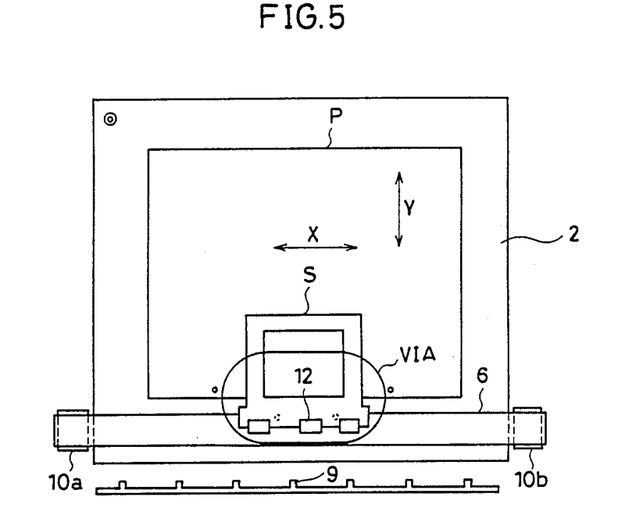
FIG. 5 is a plan view of a printing table of the conveyor-type multiple image printing machine.

The original conveying belt 6 is an endless belt having a thickness of about 0.2 mm which is wound around a pair of pulleys 10a and 10b arranged in the left and right of the printing table 2, as shown in FIGS. 4 and 5. The original conveying belt 6 can also be moved in the front and rear directions, that is, in the Y direction in relation to the printing table 2.

Referring to FIG. 5, the original film S has a front end side attached to the original conveying belt 6 by means of a sticky tape 12. The original is positioned in the X-Y directions in relation to the photosensitive material P positioned on the printing table 2. On this occasion, the printing table 2 is lowered a little to form a relatively movable space with respect to the original conveying belt 6. Air is emitted from an air nozzle 9 (see FIGS. 4 and 5) through this space, preventing the rear end of the original film S from being suspended to be in contact with the photosensitive material P.

Figures 6A, 6B:
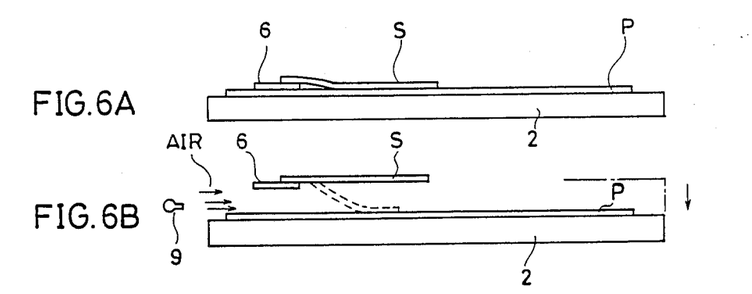
FIGS. 6A and 6B illustrate the operation of an air nozzle.

This state is shown in FIGS. 6A and 6B. In printing, the original S is placed in contact with the photosensitive material P as shown in FIG. 6A. When the original is moved, the printing table 2 is lowered as shown in FIG. 6B. On this occasion, since one end of the original film S is fixed to the original conveying belt 6, the other end of the original S which is not fixed is suspended as shown by the dotted line in FIG. 6B. If the original film S is suspended and happens to be in contact with the photosensitive material P, the photosensitive material P may possibly be damaged. Therefore, when the original S is to be moved, air is ejected from the air nozzle 9 as shown in FIG. 6B and the original S is horizontally held in the air as shown by the solid line in FIG. 6B.

Figure 7A:
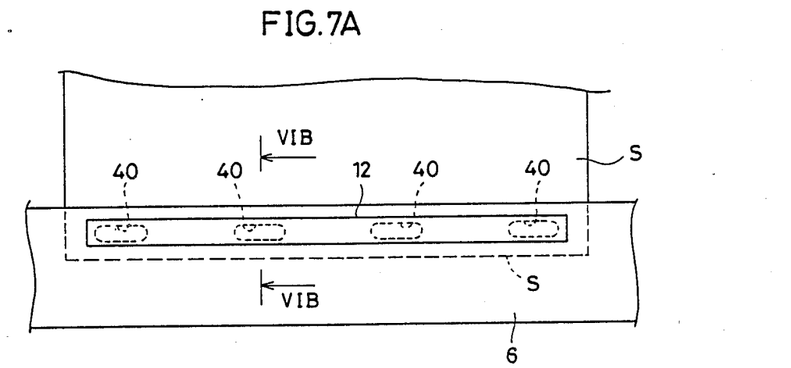
FIGS. 7A and 7B illustrate the attachment of an original onto a conveyor belt.
Figure 7B:
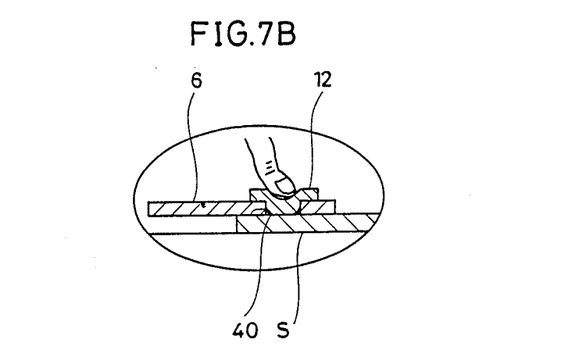

Referring to FIGS. 7A and 7B, another method of attaching the original film S onto the original conveying belt 6 will be described. FIG. 7A is a plan view showing the original S attached to a lower surface of the original conveying belt 6. FIG. 7B is a cross-sectional view of a portion shown by VIIB—VIIB in FIG. 7A. Referring to FIGS. 7A and 7B, a plurality of holes 40 are provided in the original conveying belt 6 and an adhesive tape 12 is applied on these holes. When the original S is to be attached to the original conveying belt 6, the original S is positioned by using the original conveying belt 6 and thereafter the adhesive tape 12 is pressed onto the original S through the hole 40, as shown in FIG. 7B. If the originals are attached by using the adhesive tape in this manner, the adhesive tape can be used several times and the original S can be attached to the original conveying belt 6 at one touch. The hole 40 may be a notched recess.

Details of the present invention will be described in the following with reference to FIGS. 1 and 2. The printing table 2 of the printing machine in accordance with the present invention comprises a lower frame 21, an upper frame 3 provided above the lower frame 21 and an airtight seal 14 formed beneath the upper frame 3 for sealing a space between the lower frame 21 and the upper frame 3. The lower frame 21 supports a blanket support plate 22. A flexible blanket 26 is held with only the peripheral portion thereof fixed on the blanket support plate 22. The blanket support plate 22 comprises a honeycomb core 24 and an upper plate 23 and a lower plate 25 for supporting from upper and lower directions the honeycomb core 24. A plurality of attracting grooves $D_1$ to $D_3$ are provided concentrically from the central portion to the peripheral portions in the upper plate 23 and attracting zones $S_1$ to $S_3$ are formed correspondingly thereto.

A transparent plate 5 is provided on the upper frame 4 and the masking device 13 described above is provided on the transparent plate 5. The blanket support plate 22, the transparent plate 5 and the airtight seal 14 define an exposure chamber A.

An evacuating outlet 27 connected to the exposure chamber A is provided at an end portion of the blanket support plate 22 and the evacuating outlet 27 is connected to a vacuum pump VP through an electromagnetic valve $V_4$ which cam be communicated to air. The respective attracting zones $S_1$ to $S_3$ provided in the blanket support plate 22 are connected to the seat attracting device 30 through air communicable electromagnetic valves $V_1$ to $V_3$, respectively. A pressure detecting switch SW is provided on the evacuating outlet 27, an output from which is inputted to a valve controlling circuit 31 to be connected to the respective electromagnetic valves $V_1$ to $V_3$ and the vacuum pump VP.

Figure 1:
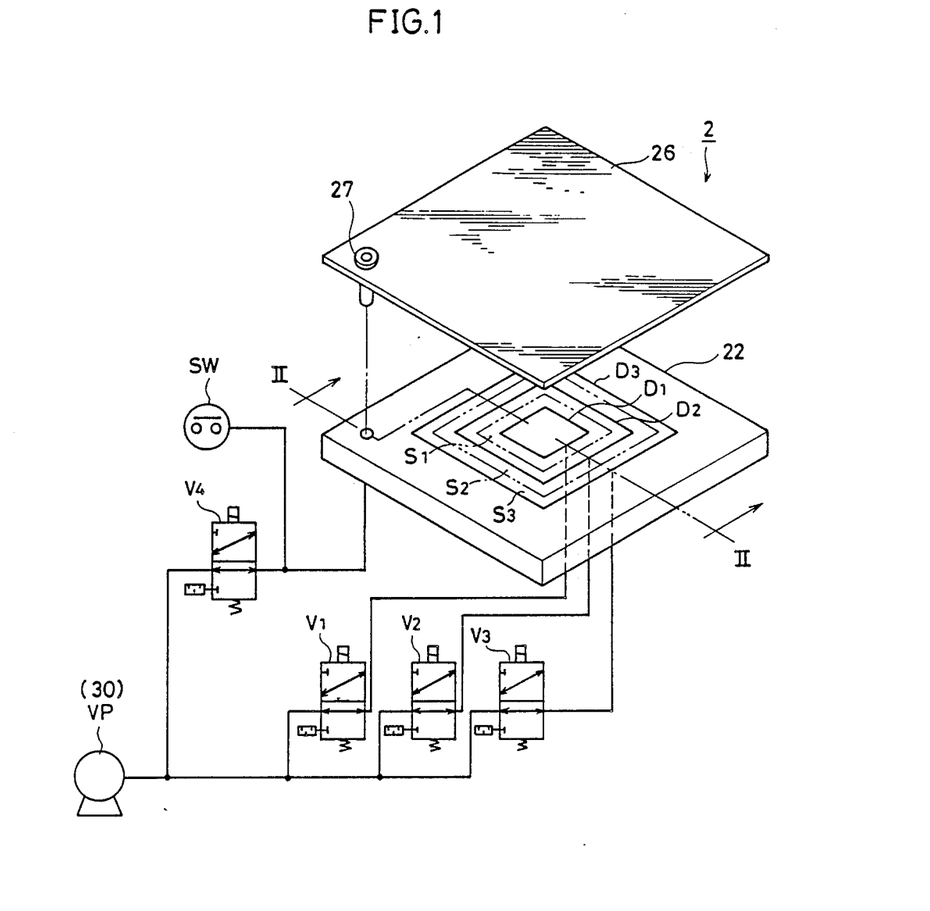
FIG. 1 is a partial perspective view of a main portion of a printing table in accordance with the present invention.
Figure 2:
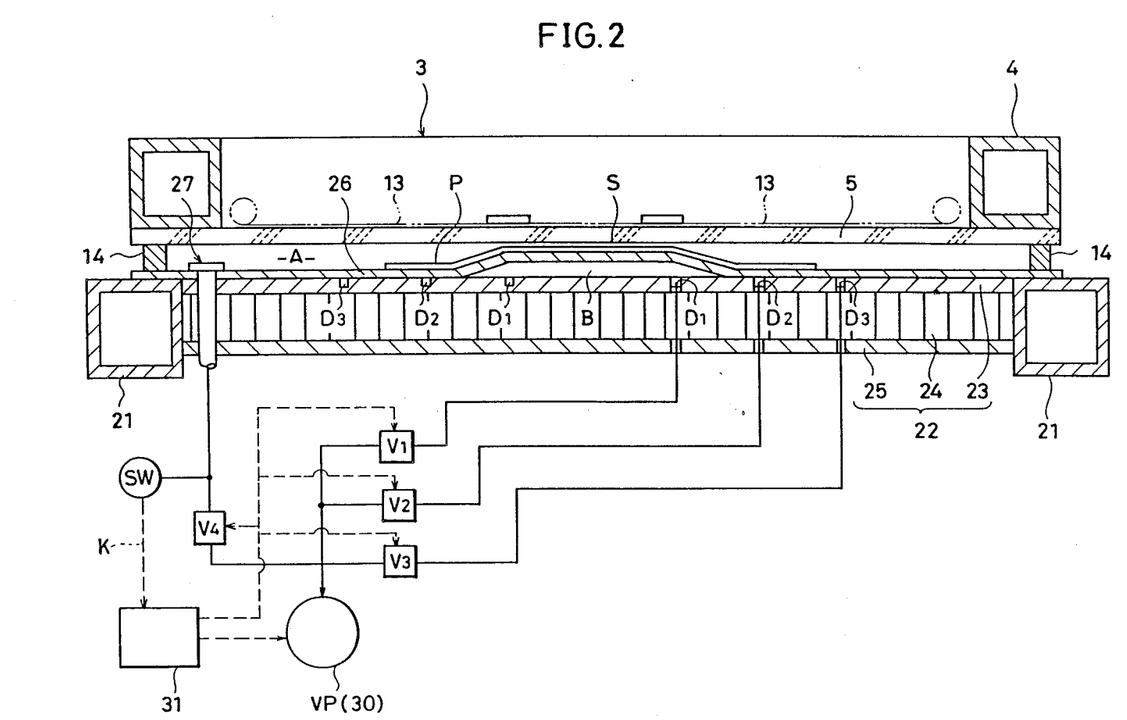
FIG. 2 is a cross-sectional view of a portion shown by the line II—II of FIG. 1.

Although the vacuum pump VP is used also for the attracting device 30 in the embodiment shown in FIGS. 1 and 2, a separate evacuating pump may also be provided.

The operation of the vacuum contact type printing machine in accordance with the present invention will be described in the following. The original film S is positioned on the photosensitive material P by means of the original conveying belt 6 in advance. In this state, the upper frame 3 is closed. In this state, all of the electromagnetic valves $V_1$ to $V_4$ are connected to the vacuum pump VP. At first, the vacuum pump VP is operated and the flexible blanket 26 is attracted to the blanket support plate 22 as air is extracted via the attracting grooves $D_1$ to $D_3$ therein. Meanwhile, the exposure chamber A formed between the transparent plate 5 and the flexible blanket 26 through the airtight seal 24 experiences a reduction in pressure.

Thereafter, when the pressure in the exposure chamber A reaches, for example, 400 mmHg, the pressure switch SW is operated and it outputs a timer start signal K. Corresponding to this signal K, a CPU in the valve controlling circuit 31 starts measuring time. After a time lapse of $T_1$ (for example 1 sec), the electromagnetic valve $V_1$ is switched to be communicated to the air so that the innermost attracting zone $S_1$ is communicated to the air. Consequently, the central portion of the flexible blanket 26 is lifted upward as shown in FIG. 2 by the atmospheric pressure. Consequently, the flexible blanket 26 is brought into contact with the transparent plate 5 with the original film S and the photosensitive material P posed therebetween, and a space B is formed in the attracting zone $S_1$.

Then, after the time lapse $T_2$ and $T_3$ (for example, 2 sec and 3 sec, respectively), the electromagnetic valves $V_2$ and $V_3$ are successively switched to be communicated with air in the same manner as described above. Consequently, the attracting zones $S_2$ and $S_3$ are successively communicated with the air. During this period, the pressure in the exposure chamber A is continued to be reduced. Accordingly, the content area of the flexible blanket 26 and the transparent plate 5 is controllably extended outwardly from the central portion to the peripheral portions.

When a time period $T_4$ has passed in this state, the original S and the photosensitive material P are fully in contact with each other. At this time, the vacuum pressure reaches, for example, 760 mmHg, i.e., atmospheric pressure.

Thereafter, the light source 8 is turned on to carry out printing. When the printing is completed, the electromagnetic valve $V_4$ is switched to be communicated with the air. The exposure chamber A is communicated with the air, the electromagnetic valves $V_1$ to $V_3$ are switched to the attracting side and the air in the space B between the flexible blanket 26 and the support plate 22 is evacuated, so that the flexible blanket 26 is attracted to the blanket support plate 22. By repeating the above described operation, multiple image printing is realized.

Structured as described above, the present invention is most effective when applied to a vacuum type printing device having a large printing table. Therefore, description was given in the foregoing in relation such a device such as a belt conveyor type multiple image printing machine. However, the application of the present invention is not limited to such devices and it may be applied to a general vacuum type printing device other than a multiple image printing machine.

In the above-described embodiment, attracting zones $S_1$ to $S_3$ are provided by the attracting grooves $D_1$ to $D_3$ on the blanket support plate 22. Attracting zones may be formed in the blanket support plate and a number of air suction holes may be provided on the upper plate 23.

The innermost attracting zone $S_1$ may be communicated with the air simultaneously with the start of evacuation of the exposure chamber A. Alternatively, it may be communicated with the air when the pressure is further reduced from the above mentioned vacuum pressure of 400 mmHg.

Communication of the attracting zones $S_1$ to $S_3$ to the air may be realized by throttles or the like. The evacuating means, the blanket attracting means and the like may be variously modified.

As described above, according to the present invention, a plurality of attracting zones are formed concentrically outward from the center on the blanket support plate, and as the pressure in the exposure chamber is reduced, attracting zones are successively communicated with the air starting from the innermost one to the outer ones. Therefore, the contact between the flexible blanket and the transparent plate is surely extended from the center to the peripheral portions. Therefore, air is not trapped at the contact portions, and vacuum attraction at high speed is enabled even in a printing machine having a large printing table.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vacuum printing device for printing with an original film and a photosensitive material being in contact with each other, comprising:
   a flexible sheet for mounting said photosensitive material having end portions;
   sheet holding means provided below said sheet and having at least a central portion and peripheral portions surrounding said central portion for fixing the end portions of said sheet;
   a sealable exposure chamber containing said sheet and sheet holding means;
   said exposure chamber having a contact surface provided facing said central portion of said sheet;
   said photosensitive material placed on said sheet with the central portion positioned at the center;
   first pressure adjusting means provided in said exposure chamber for setting said exposure chamber at a first pressure;
   second pressure adjusting means provided on said sheet holding means for selectively applying said first pressure or a second pressure higher than said first pressure to a space between said sheet holding means and said sheet; and
   first switching means for setting an output from said second pressure adjusting means at said first pressure and thereafter switching the output successively to said second pressure from the central portion to the peripheral portion of said sheet holding means.

2. A vacuum printing device according to claim 1, further comprising:
   pressure detecting means for detecting the pressure in said exposure chamber; and
   switching means controlling means responsive to an output signal from said pressure detecting means for controlling said first switching means.

3. A vacuum printing device according to claim 2, further comprising:
   a timer means, with said switching means controlling means controlling and switching means responsive to an output signal from said timer means.

4. A vacuum printing device according to claim 3, wherein:
   said first pressure adjusting means further comprises second switching means for selectively setting said exposure chamber at said second pressure.

5. A vacuum printing device according to claim 4, wherein:
   said switching means controlling means controls said second switching means.

6. A vacuum printing device according to claim 5, wherein:
   said first and second pressure adjusting means comprise a vacuum pump; and
   said second pressure comprises the atmospheric pressure.

7. A vacuum printing device according to claim 3, wherein:
   said second pressure adjusting means comprises third pressure adjusting means provided at the central portion of said sheet holding means and fourth pressure adjusting means provided at said peripheral portions; and
   said first switching means first switching said third pressure adjusting means and then said fourth pressure adjusting means.

8. A vacuum printing device according to claim 7, wherein:
   each of said third and fourth pressure adjusting means comprises a switching valve having two switching openings,
   one of said switching openings connected to first pressure generating means generating said first pressure and the other one of said switching opening connected to second pressure generating means generating said second pressure.

9. A vacuum printing device according to claim 8, wherein:
   said first pressure generating means comprises vacuum generating means; and
   said second pressure generating means comprises means for setting said other one of the switching openings to the atmospheric pressure.

10. A method of bringing an original and a photosensitive material into contact with each other in a vacuum printing device, comprising the steps of:
    placing a photosensitive material with a central portion thereof positioned at the center of a flexible sheet having ends fixed to a sheet holding means provided therebelow;
    placing said original in a position facing said sheet;
    setting a sealable exposure chamber containing said sheet holding means and said original to a first pressure lower than atmospheric pressure; and
    setting the central portion and peripheral portions of a space between said sheet and said sheet holding means to a second pressure which is higher than said first pressure.

11. A method of bringing an original and a photosensitive material into contact with each other according to claim 10, wherein:
    said step of setting said space at a second pressure comprises the steps of
    detecting a pressure of said exposure chamber; and
    setting said space to said second pressure in response to said detected pressure value.

12. A method of bringing an original and a photosensitive material into contact with each other according to claim 11, wherein:
    said step of setting said space at said second pressure comprises the steps of
    measuring a predetermined time period after the time when the pressure of said exposure chamber reaches a prescribed value; and
    setting said space at said second pressure after a lapse of said predetermined time period.

13. A method of bringing an original and a photosensitive material into contact with each other according to claim 12, further comprising the step of:
    setting said exposure chamber to said second pressure after the step of setting said space at said second pressure.

14. A method of bringing an original and a photosensitive material into contact with each other according to claim 13, wherein:
    said step of setting said space at said second pressure comprises the step of setting said space to atmospheric pressure.

* * * * *

UNITED STATES PATENT AND TRADEMARK OFFICE
CERTIFICATE OF CORRECTION

PATENT NO. : 4,984,017
DATED : January 8, 1991
INVENTOR(S) : Fumihiko NISHIDA et al It is certified that error appears in the above-identified patent and that said Letters Patent is hereby corrected as shown below:

On the title page, item [73] should read as follows:
--[73] Dainippon Screen Mfg. Co., Ltd., Kyoto, Japan--.

Signed and Sealed this

Seventeenth Day of August, 1993

*Attest:*

BRUCE LEHMAN

*Attesting Officer*    *Commissioner of Patents and Trademarks*